3,267,057
ELECTROSTATIC SPRAYABLE COMPOSITION COMPRISING A ZINC FATTY ACID SOAP AND A POLAR SOLVENT
Lester L. Spiller, Indianapolis, Ind., assignor to Ransburg Electro-Coating Corp., Indianapolis, Ind., a corporation of Indiana
No Drawing. Original application Jan. 15, 1959, Ser. No. 789,469, now Patent No. 3,112,216, dated Nov. 26, 1963. Divided and this application Sept. 11, 1963, Ser. No. 308,055
7 Claims. (Cl. 260—22)

The present invention relates to improvements in electrostatic spraying of paint and other coating compositions and is more particularly directed to the modification of paint compositions including the provision of new paint compositions to achieve improved electrostatic sprayability.

The present application is a division of my prior copending application S.N. 789,469, filed January 15, 1959, now U.S. Patent No. 3,112,216.

The invention includes methods for electrostatic spraying in which the paint composition is adjusted to provide at least partially ionizable chemical complexes providing under the influence of a field of electrostatic forces a charged component of more limited electrophoretic mobility than its counter ions, the presence of these charged particles modifying the interaction between the paint composition and a unidirectional electrostatic field, to cause the paint composition to be more efficiently sprayed under the influence of electrostatic force.

The invention further includes new paint compositions which are specifically adapted for electrostatic atomization and deposition as well as the modification or upgrading of existing paints for this same purpose.

At the present time electrostatic spraying is carried out by either mechanically atomizing the paint and then depositing the atomized spray particles in an electrostatic field in order to increase the proportion of the spray particles which are deposited upon the object to be coated, or by atomizing under the influence of an electrostatic field and electrostatically depositing the spray particles. The present invention is particularly applicable to this latter system in which, as is well known, an electrostatic charge is passed through an increment of the paint, usually in the form of a film, to a grounded article to cause the paint to be disrupted to form a spray of fine paint particles which deposit upon the article to form a film of paint thereupon.

Others previously have observed for a limited number of liquid materials that compositions with conductivity too high or too low were less atomizable by electrostatic means than those of intermediate conductivity, and that resinous solutions of higher dielectric constant were easier to spray by electrostatic means than were very non-polar liquids.

The investigations leading to the present invention have confirmed that electrical conductivity and dielectric constant are some of the factors related to, or necessary consequences of, the conditions which control electrostatic sprayability. Thus, many additives, for example polar solvents, may be added to paints for the purpose of adjusting the characteristics of the paint continuum and electrostatic sprayability may sometimes be improved in this manner. In many instances, the additives which may be used impair the quality of the paint film and the application characteristics of the paint in various other ways, or the proportion in which the additives must be employed to achieve a significant improvement of electrostatic sprayability is unduly large and excessively costly.

In the present invention, a paint of a given polar solvent content and including ionizable complexes in accordance with the present teachings possesses superior electrostatic sprayability when compared with the same paint but without the complexes. Moreover, smaller proportions of polar solvent permit a given improvement in electrostatic sprayability to be obtained.

It has generally been found that the character of the particulate matter which is dispersed as a component in the liquid continuum of the paint rarely influences electrostatic spraying. Where effects are observed, ordinarily they more often degrade rather than improve the sprayability of the liquid continuum by electrostatic means.

Surprisingly, in accordance with the present invention, it has been found that there may be established a unique co-action between the liquid components of the paint and the dispersed particulate component (solid particle or colloidal micelle) of the paint to form electrostatically influenced complexes which are distributed to create electrical discontinuities or localized portions throughout the volume of the paint, which localized portions coact with and augment the electroatomizing effect of an electrostatic field, and thereby provide an improved electrostatic spray.

THE INVENTION

In accordance with the present invention, paint or other coating compositions containing a film-forming component are provided to include complexes which ionize in the paint continuum, at least upon application of a unidirectional electrostatic potential, to provide large charged particles (of limited electrophoretic mobility) having a multiplicity of charges of one charge sign per particle and smaller neutralizing counter-ions of opposite charge and valence, usually less than 4, which, at least in part, are distributed in the liquid continuum in the vicinity of the larger oppositely charged particles. The invention is primarily directed toward compositions which are poorly sprayable by electrostatic means, either at ordinary or higher viscosity, and is, therefore, principally concerned with compositions in which the film-forming component has a dielectric constant less than 10, particularly less than 7, since these compositions are most beneficially altered. The unidirectional electrostatic field acts upon both the sluggish and mobile charged particles to produce localized tensions or stresses therebetween thus physically joining portions of the liquid continuum to a particulate component dispersed in the liquid continuum. In this manner the action of the electrostatic field is concentrated and electrostatic atomization is promoted. This improved interaction between the paints and coating compositions of the invention and the electrostatic field will be more fully described hereinafter. The charged particles and neutralizing counter-ions of the invention are desirably provided by three interacting components namely, (1) a particulate component, (2) a strong hydrogen bonding component or one which can be strongly adsorbed by the particles of the first component, and (3) a polar material of high dielectric constant which is compatible with the continuum of the paint.

THE PARTICULATE COMPONENT

The first component is a colloidal particle or micelle having a diameter of at least about 1000 A., this particle or micelle being dispersed in the paint continuum. As will later more fully appear, the second component becomes associated with the colloidal particles or micelles. This association may be by hydrogen bonding or through the agency of strong adsorptive forces.

When association with the second component is by hydrogen bonding, the particulate component must possess hydrogens sufficient to form a large number of hydrogen bonds to surrounding molecules. Preferred colloidal particles of the type under consideration fall within the class of acidic clays typified by montmorillonite clay. More generally, the acidic clays which are referred to are finely divided materials containing hydrous oxides of amphoteric metals such as aluminum, silicon or iron. One or more of these acidic clays may be added to the paint composition to assist in dispersing the pigment particles and are particularly desirable for this purpose when the paint is loaded with pigments such as titanium dioxide or iron oxide pigments.

The acidic clays which are referred to contain displaceable protons in sufficient number to show an acid reaction with indicator dyes in either an aqueous or nonaqueous medium in which the clay is dispersed; the acidity or displaceable proton capacity of such clays being measured by titrating mixtures of clay and dispersing liquid medium with alkali in the presence of an indicator like crystal violet.

Preferred acidic clays are those exhibiting comparatively high base-exchange properties. These include the montmorillonites, e.g., sodium, potassium, lithium and other bentonites such as Wyoming bentonite, magnesium bentonite and saponite. Other clays are montronite, attapulgite, illite, zeolites and fuller's earth.

The base exchange capacities of the various clays enumerated runs from about 15 to about 100 milliequivalents of exchangeable ion per 100 grams of clay.

In addition to acidic clays, such as those referred to hereinbefore, other particulate material having a valency toward hydrogen bonding with a plurality of electron-donors may be employed. These are illustrated by chelate and clathrate compounds with polyvalent metals such as titanium chelates like triethanolamine titanate or clathrate complexes produced by reaction between urea and vegetable oil fatty acids. Also, resinous components of high molecular weight forming colloidal micelles and which have a capacity toward hydrogen bonding may be used. These are illustrated by aldehyde condensation products with phenol, urea, melamine, dicyandiamide and benzoguanamine which are cooked with drying oils so as to be only partially soluble in the paint continuum providing colloidal fragments or micelles in the paint.

When association with the second component is intended to be by adsorption, the particulate component may be constituted by any one or more of the particulate materials referred to as having a capacity for hydrogen bonding or by any one or more particles of large surface area such as conventional metal oxide pigments which are represented by iron oxide or titanium oxide, or by extenders and fillers, such as talc.

THE SECOND COMPONENT

The association between the second component and the first component may take place as a result of strong adsorptive forces. Thus, the second component may be constituted by amphoteric metal soaps typified by zinc employed in the form of a solvent-soluble soap, e.g., zinc naphthenate. These amphoteric metal solvent-soluble soaps are strongly adsorbed by particles having large surface areas such as conventional metal oxide pigments as well as by other particulate materials having large surface areas such as those referred to hereinbefore as having a capacity for hydrogen bonding. Other soaps which may be used are aliphatic monocarboxylates such as oleates, linoleates, palmitates and resinates of zinc, and other amphoteric metals such as calcium and like metal soaps of the conventional mixed soap-forming fatty acids derived from vegetable and fish oils. Metal soaps possessing drier activity such as cobalt naphthenate and lead naphthenate are not usable. Moreover, the soaps having drier activity reduce the effectiveness of the non-drier soaps and preferably should be absent from the paint to enable the adsorption and disassociation mechanism to proceed with the non-drier soaps.

THE THIRD COMPONENT

The third component is a polar material of high dielectric constant which is dissolved in the paint continuum and which functions to facilitate dissociation of the complex formed between the first two components into ions without disrupting the union which exists therebetween. The third component has the further purpose of providing a liquid medium of high dielectric constant in the vicinity of the large charged particles of the same sign which are formed by said dissociation. This enables electrical forces to interact between these charged particles of limited electrophoretic mobility and their oppositely charged counter-ions which are largely confined by electrical attractive forces to the portions of the paint continuum lying adjacent the large charged particles. In this manner the large charged particles become surfaced with charges of one sign and surrounded with mobile particles of opposite sign providing what is known as a "double layer."

It is desired to point out that water is normally present in association with the particles which are distributed within the continuum of the paint. It is possible that the water which is associated with the particles is responsible for the observation that electrostatic sprayability is largely independent of the characteristics of the dispersed particulate matter. It is also possible that the dissolved third component which enables the dispersed particles to coact with the surrounding continuum in a manner improving electrostatic spraying achieves this result by an action which includes modification of the water associated with the particles.

The polar materials which are employed as the third component in accordance with the invention should possess a dielectric constant in excess of about 8. Preferably, the dielectric constant should be between 20 and 40.

When the association between the first and second components is established by virtue of a hydrogen bonding mechanism, it is essential that the hydrogen bonding capacity of the third component should be less than the hydrogen bonding capacity of the second component as indicated by a Gordy number of less than 100 preferably less than 50. The reason for this fill be immediately apparent when it is considered that the function of the third component is to facilitate dissociation of the complex formed between the first and second components into oppositely charged ions as opposed to the displacement of the second component from the first component by the third component.

When association between the first and second component is achieved through the agency of strong adsorptive forces, the maximum Gordly number of the third component becomes less critical for the reason that there is no opportunity for displacement of the second component to take place as a result of the third component having a stronger capacity for hydrogen bonding.

On the other hand, it is still preferred to employ a third component having a Gordy number less than 100, preferably less than 50, for the reason that such materials have a lesser capacity to become associated with themselves or with other components such as solvent components existing in the paint continuum. The third component is illustrated by polar solvents such as nitroparaffins, esters such as butyl acetate and ketones. Typical preferred solvents which function well in accordance with the invention at low polar solvent concentration are acetyl acetone, methyl ethyl ketone, nitroparaffins such as nitromethane and nitropropane, acrylonitrile monomer and acetonitrile.

The third component is intended to function to facilitate dissociation of the complex of the first two components and this dissociation function is achieved by a combination of third component concentration, polarity, dielectric constant and electromeric structure. Generally, the greater the polarity and dielectric constant, the lower the Gordy number of the third component, the less of the third component is required to provide an effective improvement in electrostatic atomization.

The capacity of various components for hydrogen bonding has been measured by W. Gordy et al. (see J. Chem. Physics, vol. 9, pages 207–214). Gordy compared the hydrogen bonding acceptancy of various materials relative to methanol in benzene solution by observing the degree of perturbation of the ordinary vibrational frequency of the O–D bond of $CH_3OD$ when benzene was replaced as the solvent by the other material being rated. (A heavy hydrogen methanol $CH_3OD$ was used instead of $CH_3OH$ because the OD bond is more convenient for spectroscopic isolation than the O–H which can get confused with irrelevant hydrogens present.) Gordy diluted 1 mol of methanol to 1000 cc. of solution in benzene, to obtain in the infrared spectrum a reference wave length peak. When other liquids of greater hydrogen acceptance (or greater electron donor) capacity were substituted for benzene, the wave length peak shifted to a lower frequency (or longer wave length) than was characteristic in benzene solution, and the change in frequency (or wave length) expressed as $\Delta\gamma$ in reciprocal centimeters (or $\Delta\eta$ in microns) was found to be a more sensitive measure than are most other methods of rating the hydrogen bonding acceptancy of the materials for the deuterium atoms in the reference compound deutero-methanol.

PROPORTIONS

The proportion of the components which associate with one another to form charge-concentrating complexes may vary considerably, it being preferred to employ as little as possible of these components so as to minimize modification of the basic characteristics of the paint which is improved.

When the second component is an amphoteric solvent-soluble metal soap, it has been found that very small proportions are effective. Thus, as little as 0.0001% based on the weight of the paint is generally adequate. Preferably from .001–0.1% by weight is used. While larger amounts of 1% up to about 5% may be used, this is not necessary and is wasteful.

The third component which is normally a polar organic liquid should be dissolved in the liquid continuum of the paint in an amount sufficient to effect at least partial ionization of the complex of the first two components. Desirably, at least about 3% by weight based on the weight of the paint should be present. Preferably, this liquid should be a solvent for the film-forming resinous constituents of the paint. Desirably, the polar organic liquid is present in an amount of at least 300% based on the combined weight of the first two components.

A feature of the invention is the electrostatic spraying of heavily loaded undercoating compositions such as primers, primer surfaces and surfacing compositions which comprise an oil fatty acid ester of a resinous intermediate having a plurality of hydroxy functionalities dissolved in an organic solvent and containing metal oxide pigment filler material, and particularly red iron oxide as the major particulate filler, the total filler content being in excess of about 35% by volume based on the combined volume of filler and resin. These heavily loaded primers do not normally respond well to electrostatic atomization and deposition and leveling difficulties are encountered in the deposited film. The invention improves atomization and film flow on deposition with minimum modification of the primer composition and without encountering running and sagging in deposited films of desired thickness.

This aspect of the invention is illustrated by the use of an amphoteric metal soap of a linear or cyclic aliphatic hydrocarbon monocarboxylate which does not possess drier activity and which is preferably used in the absence of driers.

Thus, zinc naphthenate is milled into association with the red oxide pigment.

It is esesntial that the pirmer include from 3–15%, preferably from 3–8%, by weight based on the weight of the paint of a polar solvent having a dielectric constant above 15 and preferably also a low Gordy number in addition to the soap.

The polar solvent which is selected should, for safety reasons, have a flash point above 50° C., preferably above 75° C., and preferably should possess a Gordy number of less than 50. Nitroparaffins such as nitropropane are of outstanding value. Nitrohydroxy compounds like 2-nitro-1 butanol or aminohydroxy compounds like 2-amino-1 butanol may also be used.

Accordingly, this aspect of the invention will be illustrated using zinc naphthenate and a minimum proportion of nitropropane consistent with the achievement of superior atomization and deposition.

The resins which are employed in the primers under consideration comprise oil fatty acid esters of a resinous intermediate having a plurality of hydroxy functionalities. These are typified by alkyd resins produced by condensing a polyol such as glycerol or glycerol in admixture with glycols such as ethylene or propylene glycol, or glycerol in admixture with pentaerythritol, with a dicarboxylic material or an anhydride thereof such as maleic acid or anhydride, fumaric acid or anhydride, or phthalic acid or anhydride, etc. The condensate is then cooked with an oil or an oil fatty acid, particularly a drying oil such as linseed oil, soya oil or chinawood oil to esterify the hydroxy groups remaining in the alkyd intermediate.

These oil-modified alkyd resins are desirably employed together with hardening resins which may be employed in an amount of from 10–40% by weight based on the weight of the resin mixture.

The hardening resin component is desirably a mixture of an epoxy resin with a heat-hardening, solvent-soluble urea-formaldehyde resin.

The epoxy resins are preferably based on aromatic diols and particularly on bisphenols such as bisphenol A which are reacted with epichlorohydrin to form glycidyl polyethers of bisphenol. Polyether polyepoxides so produced having a 1,2 epoxy equivalent of from 1.4–2 and a molecular weight of at least about 360 are preferred. Desirably the epoxy resin should have a molecular weight of from 1000–4000.

The epoxy resin and the solvent-soluble urea formaldehyde resin are desirably used in admixture in ratios of from 3:1 to 1:3.

Heat-hardening phenol-formaldehyde condensates in a solvent-soluble "B" stage may also be used. These are prepared by reacting a phenol such as phenol itself with at least 0.8 mol of formaldehyde per mol of phenol. The reaction is desirably performed in alkaline medium, though this is not essential.

Example I illustrates a preferred primer which cannot be adequately electrostatically atomized and deposited.

*Example I*

Resin—16 parts constituted by:

(1) 75% of an oil-modified alkyd resin produced by reacting glycerol and phthalic anhydride and then cooking the alkyd resin so produced with soya oil in a molecular ratio of oil fatty acid to phthalic carboxyl of 1.0:1.0 to provide a clear solution;

(2) 15% of a diglycidyl ether of bisphenol A having an average molecular weight of 1850, a melting point of 95–105° C., an epoxy value of 0.11 and an hydroxyl value of 0.34.

(3) 10% of a solvent-soluble urea-formaldehyde resin provided as a 50% resin solids solution in a 50:50 mixture of butanol and mineral spirits, the resin being prepared by polymerizing and etherifying dimethylol urea in an excess of butanol by heating in the presence of phosphoric acid, azeotropically distilling off water and then neutralizing the resin so produced.

Pigment—56 parts of red iron oxide

Solvent—28 parts:
    2.5 parts of butanol
    12.5 parts of mineral spirits
    13 parts xylene The primer was prepared by grinding the pigment into the resin in a ball mill using part of the solvent as necessary to obtain proper cascading in the ball mill.

Upon electrostatic atomization and deposition of the primer set forth above, electrostatic atomization was fair but the film did not level and contained hills and valleys necessitating extensive sanding.

*Example II*

The primer of Example I was modified by the addition of further xylene. Leveling improved but adequate film thicknesses could not be deposited without running and sagging.

*Example III*

The primer of Example I was modified by replacing portions of the non-polar hydrocarbon solvents (mineral spirits and xylene) with polar solvents such as butyl acetate, Cellosolve, butanol, acrylonitrile monomer and nitropropane. In each instance, adequate leveling could not be achieved.

*Example IV*

The primer of Example I was modified by incorporating 0.0001, 0.001, 0.01, 0.1 and 1 part of zinc naphthenate with the red iron oxide pigment prior to grinding the pigment into the resin. Adequate leveling was not achieved in any instance.

*Example V*

The primer of Example I was modified by incorporating 0.0001 part of zinc naphthenate in with the red iron oxide pigment prior to grinding the pigment into the resin and 3 parts of xylene were replaced with 2-nitropropane. Electrostatic atomization improved significantly and adequate leveling was achieved.

*Example VI*

Example I was repeated using 0.001 part of zinc naphthenate and 6 parts of 2-nitropropane in place of an equal amount of xylene. Electrostatic atomization and leveling improved further.

The invention is defined in the claims which follow.

I claim:

1. A primer composition comprising as film-forming component an oil fatty acid ester of a resinous intermediate having a plurality of hydroxy functionalities dissolved in a substantially non-polar hydrocarbon solvent and containing an excess of about 35% by volume of a metal oxide pigment as the major particulate filler based on the combined volume of film-forming component and filler, said composition including at least 0.0001% by weight based on the weight of the primer of a zinc fatty acid soap of an aliphatic monocarboxylic acid, and from 3–15% by weight based on primer of a polar solvent having a dielectric constant in excess of 15.

2. A primer composition as recited in claim 1 in which said soap is zinc naphthenate.

3. A primer composition as recited in claim 2 in which said zinc naphthenate is present in an amount up to 0.1% by weight.

4. A primer composition as recited in claim 1 in which said polar solvent has a Gordy number of less than 50.

5. A Primer composition as recited in claim 1 in which said solvent is a liquid nitroparaffin.

6. A primer composition as recited in claim 1 in which said resinous intermediate is an alkyd resin and said alkyd resin is esterified with a drying oil.

7. A primer composition as recited in claim 6 in which said film-forming component includes from 10–40% by weight of a mixture of a polyglycidyl ether of a dihydric phenol having a molecular weight in excess of about 360 and a 1,2 epoxy equivalency of at least about 1.4, and a solvent-soluble heat-hardening phenol formaldehyde resin condensate in a weight ratio of from 3:1 to 1:3.

References Cited by the Examiner

UNITED STATES PATENTS

| | | | |
|---|---|---|---|
| 2,885,360 | 5/1959 | Haden et al. | 106—253 |
| 3,027,341 | 3/1962 | Boucher et al. | 260—22 |
| 3,080,331 | 3/1963 | Thielking | 260—22 |

OTHER REFERENCES

Singer: Fundamentals of Paint, Varnish and Lacquer Technology, American Paint Journal Company, St. Louis 3, Mo., 1957, 330 pages (pages 45–51, 55, 61, 62, 97, 213, 215, 218, 260 and 281 relied upon).

LEON J. BERCOVITZ, *Primary Examiner.*

R. W. GRIFFIN, *Assistant Examiner.*